April 10, 1951 A. S. FITZ GERALD 2,547,933
AUTOMATIC TEMPERATURE CONTROL SYSTEM
Filed Dec. 12, 1946 4 Sheets-Sheet 1

INVENTOR
ALAN S. FITZGERALD
BY
ATTORNEYS

Patented Apr. 10, 1951

2,547,933

UNITED STATES PATENT OFFICE 2,547,933

AUTOMATIC TEMPERATURE CONTROL SYSTEM

Alan S. Fitz Gerald, Wynnewood, Pa., assignor to Warren Webster & Company, Camden, N. J., a corporation of New Jersey Application December 12, 1946, Serial No. 715,855

7 Claims. (Cl. 236—91)

This invention relates to electrical control systems and more particularly to systems for controlling a process or service in such a way that the rate or intensity of the said process is controlled in accordance with the magnitude of a physical quantity.

My invention is particularly applicable to heating systems and especially to major heating systems employed in large buildings wherein extensive radiation is installed.

My invention may with advantage be carried out with magnetic amplifier arrangements of the type I have described in my co-pending application, Serial No. 719,445, filed December 31, 1946.

It is an object of my invention to provide improved means and methods for varying the amount of heat delivered to a building in accordance with the temperature of the air outside of the building.

It is another object of my invention to provide improved means and methods for maintaining a predetermined relation between the temperature of the outside air and the amount of heat delivered to a building.

It is further object of my invention to provide an especially flexible control system by means of which the relation between the temperature of the air, and the heat delivered, may be varied so as to select a plurality of different control characteristics.

It is yet another object of my invention to provide means for adjusting the control characteristics in accordance with a plurality of different circumstances, as for example, different contemplated minimum temperatures of the outside air, or minimum temperatures of the heating vapor or fluid.

It is yet another object of my invention to accomplish the above results with apparatus of an exceptionally reliable type, combining a high order of sensitivity with freedom from contacts, moving parts, or apparatus requiring maintenance, attention, or renewal.

These and other novel features which I believe to be characteristic of my invention will be set forth with particularity in the appended claims. My invention itself, however, both as to its organization and method of operation, together with further objects and advantages thereof, may best be understood with reference to the following description taken in connection with the accompanying drawings, in which:

Figure 1:
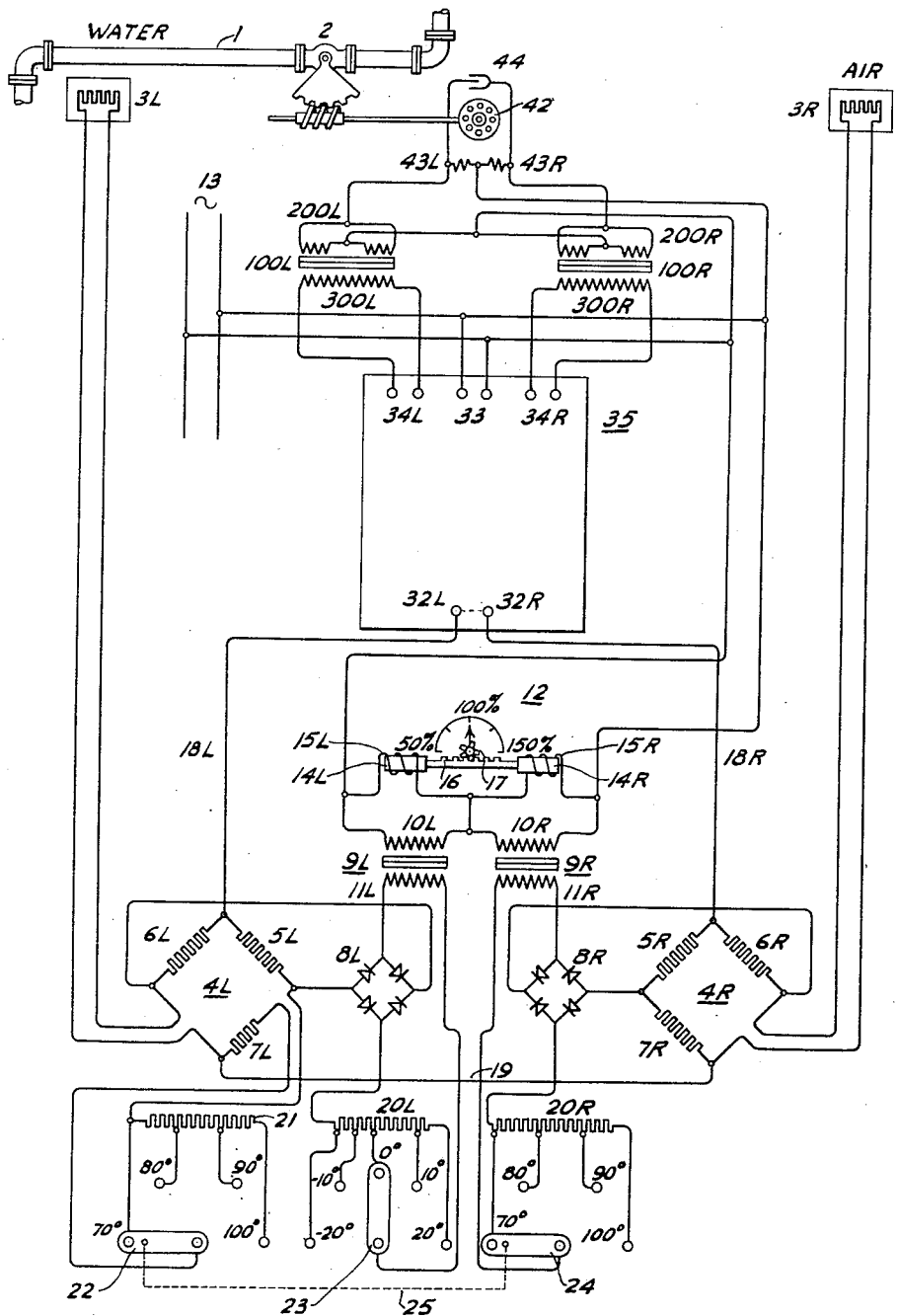
Fig. 1 is a diagrammatic representation of an embodiment of my invention.

Referring to the drawings, I show in Fig. 1 a portion of a fluid or vapor heating system 1, including a control valve 2. The valve 2 is actuated through a temperature responsive control system comprising a pair of thermal resistance elements 3L, 3R. The element 3L is mounted adjacent to or otherwise responsive to, the temperature of the heating medium. The thermal element 3R is mounted at a suitable location out-of-doors so as to be responsive to the ambient external temperature.

According to my invention the heating medium is at all times maintained at a temperature which is in direct relation with the ambient temperature.

My control system comprises two bridge circuits 4L, 4R each comprising the thermal elements 3L, 3R and three other resistors of fixed value 5L, 5R, 6L, 6R and 7L, 7R.

The bridges 4L, 4R are energized from an A. C. source 13 through two rectifiers 8L, 8R and two isolating transformers 9L, 9R having primary windings 10L, 10R and secondary windings 11L, 11R.

The two primary windings 10L, 10R as shown in the drawing, are connected in series across the source 13. I also connect across the source 13 a control device 12 for manually varying the relative energization of the transformers 9L, 9R and accordingly the relative energization of the bridges 4L, 4R likewise. The control device 12 comprises a variable inductance structure consisting of two solenoids having conjoined plungers 14L, 14R partially entering into coils 15L, 15R together with manually operable means such as a rack 16 and a pinion 17.

The junctions between 10L, 10R and 15L, 15R respectively are connected together.

It will be apparent to those skilled in the art that when the two plungers 14L, 14R are in midposition, that is to say, equally entrant into the windings 15L, 15R, the voltages across 15L, 15R will be equal as will also be the voltages across the primary windings 10L, 10R.

It will be evident that if the plungers 14L, 14R are moved towards the left so that 14R enters further in to the coil 15R and the plunger 14L is retracted from the coil 15L, the impedance of 15R will increase and that of 15L will decrease. Accordingly the voltage across 10R will increase and that across 10L will decrease. Thus the energization of the bridge 4R will be augmented and that of the bridge 4L will be reduced.

As shown in Fig. 1 the bridges 4L, 4R are energized across their horizontal diagonals with rectified current from the rectifiers 8L, 8R. The bridges 4L, 4R are connected in series through their vertical diagonals by means of conductors 18L, 18R, and 19, and through the input 32L—32R of a magnetic amplifier 35 as referred to hereinafter If the resistors 5L, 5R, 6L, 6R be considered to be bridge ratio arms of equal valve, the value of the resistance in the arms adjacent to the thermal elements 3L, 3R, that is to say the arms in which resistor 7L, 7R are situated, may be adjusted so that the bridges are in balance under temperature conditions such that no heating control action is desired. This might be the case if the ambient temperature out-of-doors were about 70, as might also be the temperature of the fluid in the heating system 1.

Thus the bridges, 4L, 4R may be considered to be in balance at 70° F. at which condition there will be no E. M. F. existing between conductors 18R and 19; nor between 18L and 19. Should the weather become colder the bridge 4R will no longer remain in balance and there will appear between conductors 18R and 19 a direct current voltage which will be in accordance with the drop in outdoor temperature.

For the purpose of explanation of the operation of my invention it will be assumed that when the bridge 4R goees out of balance, due to fall of temperature, conductor 18R becomes positive with reference to conductor 19. It will be apparent to those skilled in the art that this will depend upon the manner of connection of the rectifier 8R to the bridge 4R, that is to say, whether the right hand or left hand diagonal of the bridge is made positive or negative; and in addition whether the temperature coefficient of the thermal elements 3R is positive or negative.

My invention may be carried into effect with thermal elements 3L, 3R made of a material of either a positive or negative temperature coefficient. Since the bridge 4L goes out of balance with increasing temperature and the bridge 4R goes out of balance with decreasing temperature, if desired, the element 3L may be made of a material having a positive coefficient, and the element 3R may be made of a material having a negative coefficient. This selection has the advantage that both of the bridges go out of balance congruently, that is to say, the action which obtains during the operation of my invention will be such that both bridges will become unbalanced at the same time with increase of resistance in one arm.

Figure 2:
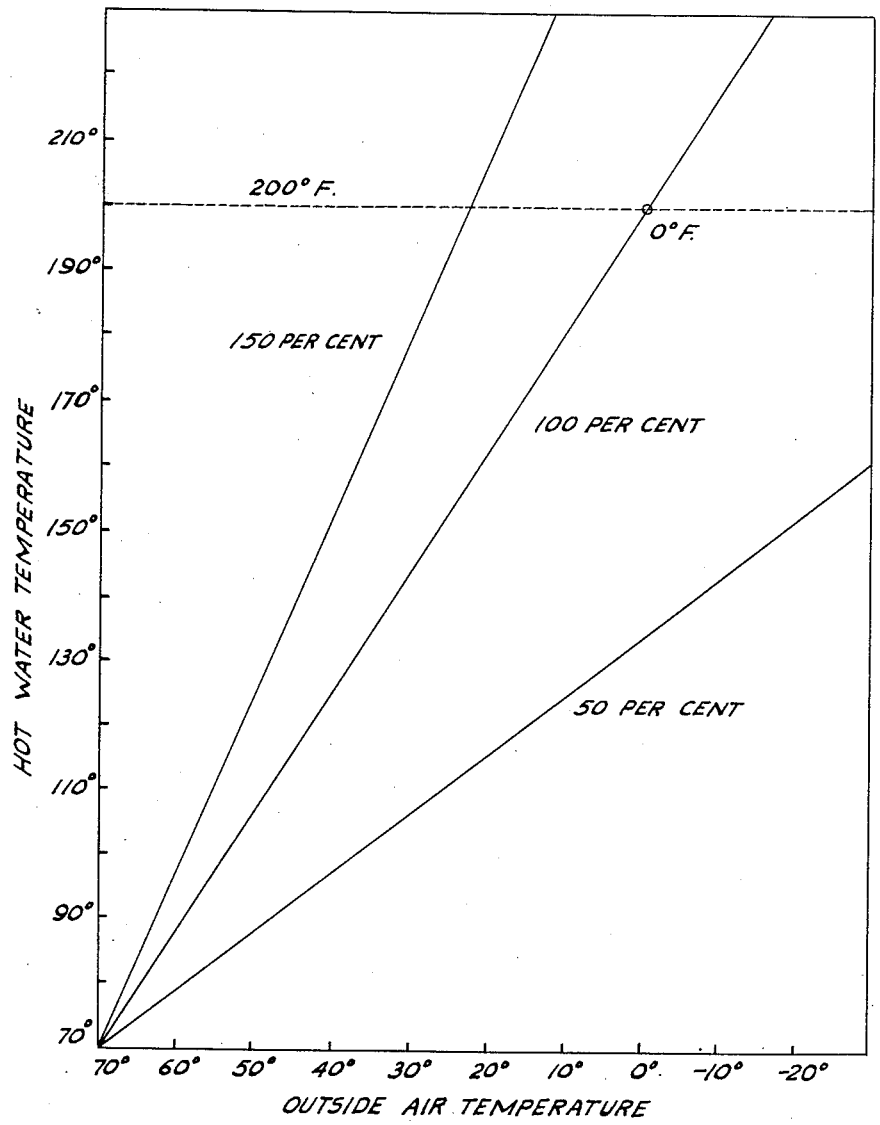
Fig. 2 is a chart illustrating the manner of operation of a feature of the embodiment of my invention shown in Fig. 1.
Figure 3:
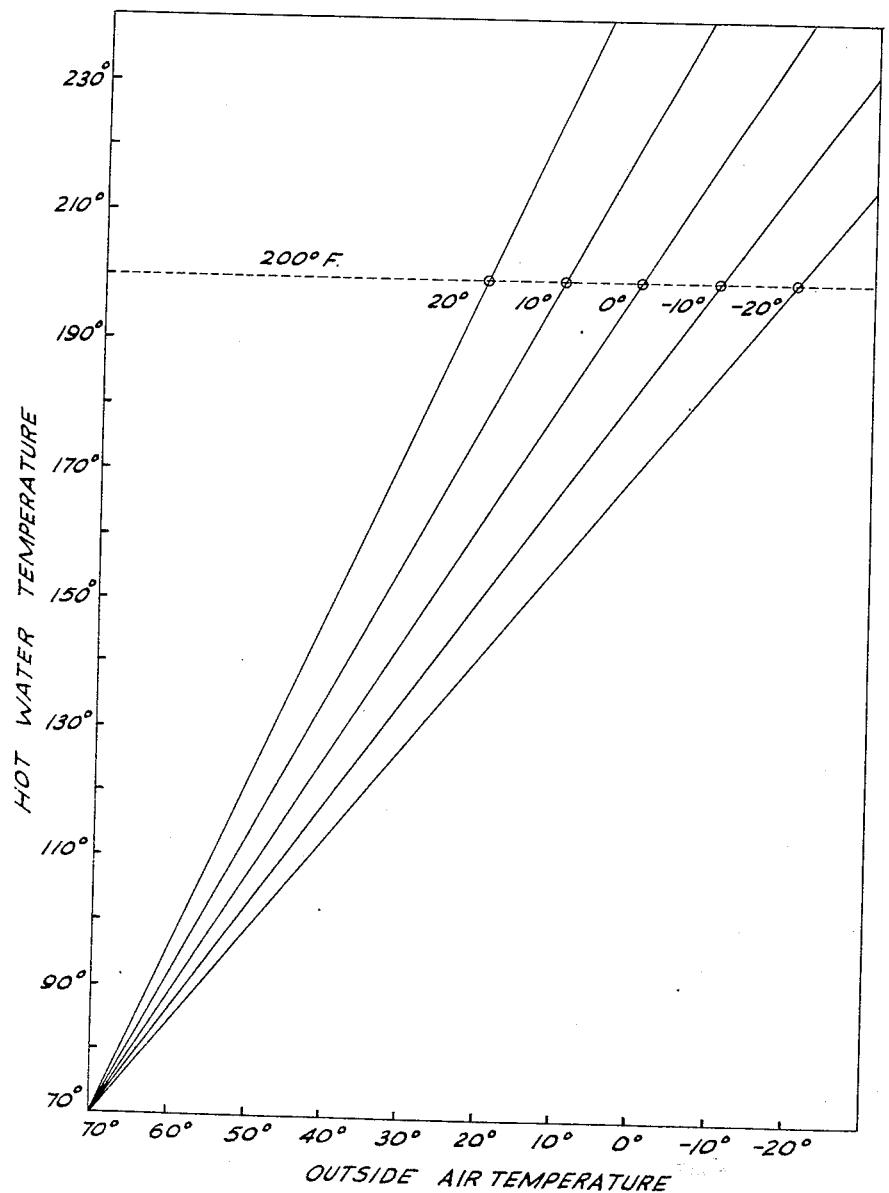
Fig. 3 is another chart illustrating a further feature of the action of my invention.
Figure 4:
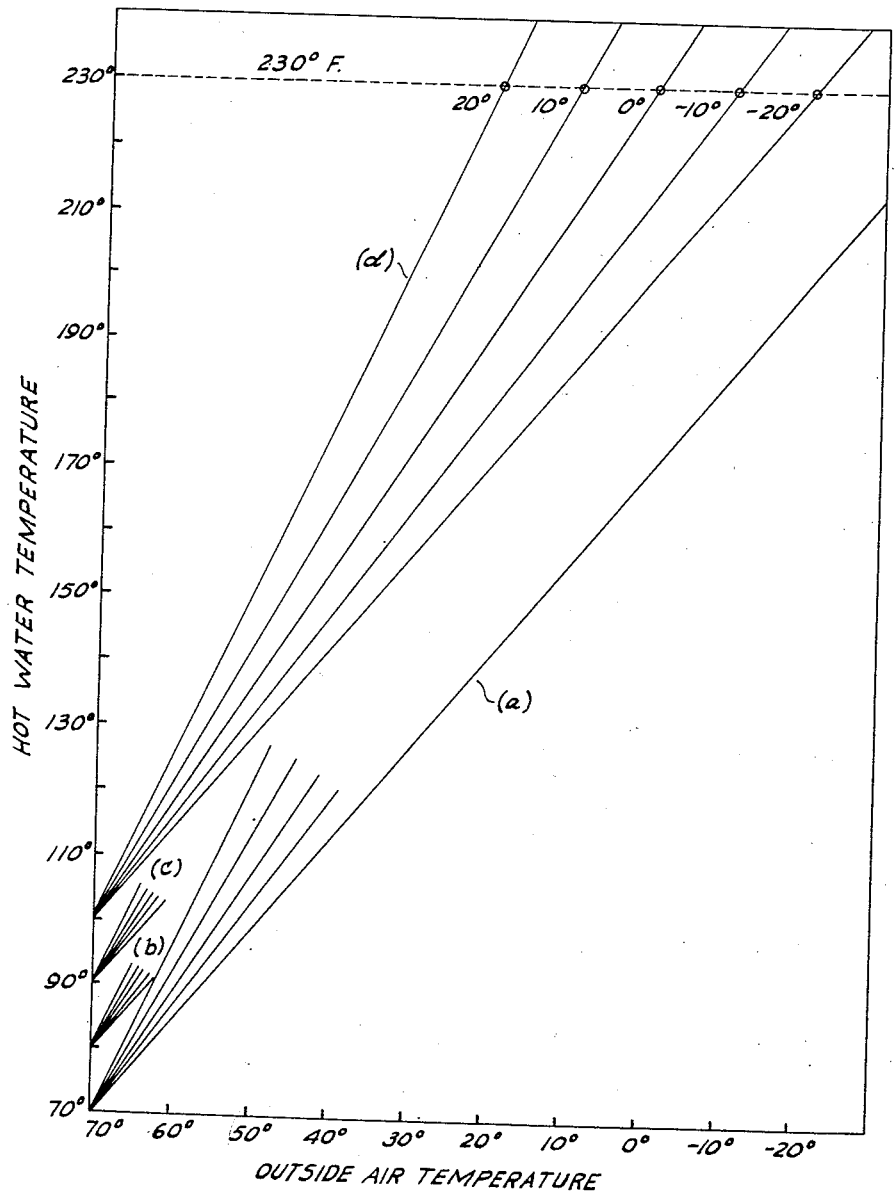
Fig. 4 is yet another chart illustrating the manner of operation of a further feature of my invention.

Under these conditions the characteristics shown in the charts of Figs. 2, 3, and 4 will be straight lines. If both of the elements 3L and 3R have like temeprature coefficients there will be a slight tendency towards curvature of the lines indicating characteristics in Figs. 2, 3, and 4. However, this tendency towards curvature of the characteristics can be minimized by maintaining a suitable minimum value for the resistances 20L and 20R (as hereinafter described).

In like manner the bridge 4L may be adjusted to balance at 70° F. The thermal element 3L will normally be subjected to temperatures rising above 70° F. Accordingly, the connections between the bridge 4L and the rectifier 8L are made so that when the bridge becomes unbalanced due to increase of water temperature the conductor 18L becomes positive in relation to the conductor 19.

The bridges 4L, 4R, as to their vertical diagonals, are connected by the conductors 18L, 18R and 19, in opposition.

In addition I shown in Fig. 1, three tapped resistors 20L, 20R, and 21. These resistors are for the purpose of adjusting the control action of my invention so as to give a plurality of different operating characteristics at will. As shown in the diagram the resistor 21 is connected in the adjacent arm of the water bridge 4L, in series with fixed resistor 7L. Means are provided for selecting a plurality of different values of the resistors 21, 20L and 20R as for example by means of movable links indicated at 22, 23, and 24, each of which may be placed in one of several positions. For example, I have shown in Fig. 1, an arrangement for selecting any one of four different resistance values for the resistor 21. I have a similar arrangement in respect of the resistor 20R. As will be explained in greater detail hereinafter the adjustment of 20R is to be coordinated with that of 21. I prefer that this should be accomplished by means of some form of insulating mechanical arrangement connecting 22 with 24 such as I have indicated schematically by the broken line at 25.

I show also in Fig. 1 an arrangement for selecting any one of five different resistance values for the resistor 20L.

The several positions of the links 22, 23, 24 are indicated on the drawing by the legends 70°, 80°, 90°, and 100° and −20°, −10°, 0, +10, +20 which have reference to the performance characteristics desired as will be hereinafter explained in greater detail.

Conductors 18L, 18R are connected to a magnetic amplifier 35 for controlling the valve 2, by means of an arrangement which may be substantially similar to that which I have shown in Fig. 6 of my co-pending application Serial No. 719,445 to which reference may be had for further detailed description.

In brief the magnetic amplifier 35 has two binding posts 32L, 32R for receiving an input of reversible direct current polarity. The magnetic amplifier 35 also has two pairs of output terminals 34L, 34R for supplying amplified direct current to saturable core devices having cores 100L, 100R, A. C. windings 200L, 200R and D. C. saturating windings 300L, 300R to which binding posts 34L, 34R are connected.

The valve 2 of a hot water heating line 1 is actuated by a motor which may be of the induction type having a rotor 42, windings 43L, 43R and a capacitor 44, energized from the A. C. source 13 all as described in my co-pending application Serial No. 719,445. As therein explained when D. C. input is applied to 35 of polarity such that 32R is positive and 32L is negative current is delivered by 34R to the saturating winding 300R but no appreciable current is delivered by 34L to 300L under which condition the motor turns in one direction. In Fig. 1, under this condition the motor should operate in the direction which increases the amount of heat delivered.

Conversely if 32L is positive with regard to 32R the motor will operate in the reverse direction, that is to say, less heat will be furnished to the heating system.

From the above description it will be clear that when the right hand bridge 4R, in Fig. 1, goes out of balance the effect is to cause the temperature to be raised. In like manner when the left hand bridge 4L goes out of balance there is set up control action causing the water temperature to be lowered.

We may now consider the conjoint action of the two bridges. If the temperature is exactly 70° F. both bridges, by hypothesis are balanced and no voltage appears between 19 and either 18L or 18R; nor is there any energization of impact terminals 32L, 32R of magnetic amplifier 35.

If the outdoor temperature drops the air bridge 4R will become unbalanced. This will cause the motor to open up the valve 2 and increase the water temperature. As a result of this the water bridge 4L will also become unbalanced. Since the air and water bridges 4L and 4R are in opposition as soon as the out-of-balance voltage appearing between 19 and 18L equals that which exists between 19 and 18R, 32L and 32R will again be de-energized and the motor will come to rest.

It is therefore apparent that for any given temperature of the outside air there will be a corresponding temperature of the water in the heating system which will cause the system either to come into a condition of static balance, or to fluctuate within narrow limits.

This condition may be illustrated by the chart in Fig. 2. For the purpose of explanation in reference to Fig. 2 it is assumed that links 22 and 23 are in the position indicated in Fig. 1 by the legend 70°. It will be noted that under this condition there is no additional resistance added in the arm of the water bridge 4L in which the resistor 7L is situated. Under this condition 4L is adjusted for perfect balance when the water temperature is 70°. In Fig. 1, I show the link 23 in the position indicated by the legend 0°. This is the position in which the link 23 is to be placed if it is desired that the maximum prescribed volume of heat in the heating system is to be delivered if the outdoor temperature falls to zero degrees F. For example, let it be assumed that the maximum desired water temperature is 200° F.

Accordingly in practicing my invention, to secure this operating condition, the control device 12 is set in mid-position, which position may be designated by the legend 100%, to indicate that normal controlling action is desired. The value of the resistor 20L, at the tap marked zero, is then set so that when the water temperature is 200 the out-of-balance voltage set up by the water bridge 4L, between conductors 18L and 19 is exactly equal to the out-of-balance voltage set up by the air bridge 4R between conductors 18R and 19 when the out-of-door temperature is zero.

The energization of the air bridge under this condition, the link 24, as stated, being in the position marked 70°, is adjusted to the correct amount by setting the resistance of 20R with link 24 so placed, at the proper value.

Referring again to Fig. 2 I have shown therein a point marked 0°, which is at the intersection of the axes corresponding respectively to an outdoor air temperature of zero and a water temperature of 200°. The middle of the three lines shown in Fig. 2 is drawn from the axis of balance, that is to say, 70° air temperature and 70° water temperature, through this point. This line indicates the control characteristic of my invention. For any given outdoor air temperature the corresponding hot water temperature at which the two bridges will balance, and at which the motor will come to rest, can be read off.

I also show in Fig. 2 the effect of adjusting the control device 12.

For example, if the weather condition is such that high winds are likely, whereby the heat dissipation of a building may be increased, it may be desirable that heat be delivered, for any given outside air temperature, at a somewhat greater rate than that indicated by the middle line in Fig. 2. Accordingly, I may adjust the control device 12 so that more than 100 per cent of the normal heating action is given. For example, I may turn the control 12 to the extent indicated in the figure by the legend 150% thereby retracting the plunger 14L from the coil 15L and displacing 14R correspondingly so that the voltage applied to the primary windings 10 are no longer equal, the transformer 9R being energized to a greater extent than 9L. This will energize the air bridge more and the water bridge less. Since the effect of the air bridge is to increase the heat and that of the water bridge is to reduce the heat, this will, for any given outdoor temperature produce a controlling action so as to maintain the water temperature at a higher value than that indicated by the middle line in Fig. 2.

Since however, irrespective of the relative energization of the two bridges, neither of them produces any out-of-balance voltage at 70°, the operation of 12 does not effect the intersection of the control characteristic, as indicated by the lines in Fig. 2, with the normal temperature axis; that is to say, the lower left hand corner of the chart in Fig. 2 corresponding to 70° both air and water temperature.

Thus the action of the control device 12 is to swing the line representing the control characteristic about the normal temperature axis. I have therefore shown on Fig. 2 the characteristic that results with the control device 12 set to the 150 percent corresponding to an increase in delivered heat of 50 per cent above normal.

Conversely if the device 12 be moved in the opposite direction the effect is to deliver less than the normal amount of heat for any given air temperature. Accordingly I have shown in Fig. 2 a third line marked 50% which shows the control characteristic when the device 12 is so positioned.

The control device may desirably be adjusted to give less than 100 per cent heating action in the absence of wind and when the building to be heated is exposed to direct sunlight.

The effect of the adjustment of the value of the resistor 20L, by shifting the link 23 is indicated in Fig. 3 in which, in similar manner, the relation between the water temperature maintained, and the outdoor temperature, is shown.

Again since the water bridge 4L is in balance at 70°, variation in the extent to which 4L is energized produces no change in the characteristic at 70°. However, if the energization of the water bridge 4L be decreased, as by increasing the value of 20L, in order that the out-of-balance voltage of 4L may be equal to any given out-of-balance voltage of 4R, the water bridge must be unbalanced to an additional extent. In other words, a greater water temperature will be necessary. Conversely if it be desired to have less heat for any given air temperature, the energization of the water bridge 4L should be increased by reducing the value of the resistor 20L.

Accordingly, the five lines shown in Fig. 3 are drawn through the intersection of the 200° axis with, respectively, the −20, −10, 0, +10, +20 values of the air temperature. Thus each of these five lines shows the characteristic of the control action that will be given for each of the five correspondingly designated positions of the link 23.

The characteristics shown in Fig. 3 refer to the one hundred per cent setting of the control device 12.

It is to be pointed out that this control action produces substantially the same result as does adjustment of 12. However, it is desirable, when installing equipment according to my invention, to select one of these five positions for a permanent setting according to the climatic zone in which the apparatus is situated. It will be noted that the third or middle line shown in Fig. 3 is identical with the middle line shown in Fig. 2.

For any of the five positions of the link 23 more or less than the normal or 100 per cent control action, may be secured by adjustment of the control device 12. In other words a control action corresponding to a displacement of any one of the five characteristics indicated in Fig. 3, clockwise or counter-clockwise, pivoting at the normal temperature axis of 70, may be produced by operation of the device 12.

I show in Fig. 4 additional modified control characteristics which may be carried into effect by adjustment provided and hereinbefore described, in reference to the resistors 20R and 21. As stated, the characteristics indicated in Fig. 2 and Fig 3 are obtained if the links 22 and 24 are placed in the positions indicated by the legend 70°. Under this condition the water bridge 4L is in balance at 70°. In Fig. 4 I show at (a), in part, the five control characteristics indicated in Fig. 3, that is to say, the characteristics furnished with the links 22, 24 at the position marked 70 omitting the upper portion where intersection would create confusion.

Under certain heating system conditions it may be desired to operate with a higher water temperature base, as for example, 100° instead of 70°; that is to say, it may be desired to maintain a water temperature of 100° F. when the out-door temperature is 70. According to my invention this result may be accomplished by adjusting the resistance 21 so that the water bridge 4L is in balance at 100° instead of at 70°. Assuming that the thermal element 3L has a positive temperature coefficient this will require the addition of resistance in the conjugate arm of 4L in which the resistor 7L is situated, since the resistance of 3L will be greater at 100° than at 70°. Accordingly the resistance of the whole of the resistor 21, which is utilized with the link 22 at the position marked 100°, is given the appropriate value.

This alone will not accomplish completely the desired result. If the bridge is adjusted to balance at 100° instead of 70°, at some higher value of temperature, as for example, 200° F., the bridge 4L will not be as much out-of-balance as will be the case, at the same temperature, if it were balanced at 70° instead of 100°.

Accordingly for any given water temperature, the out-of-balance voltage set up by the bridge 4L between the conductors 18L and 19 will be less, with the bridge set to balance at 100°, than would be the case if balanced at 70°. Thus to maintain any desired water temperature it is necessary to modify the relation between the energization of the two bridges 4L, 4R. Since the out-of-balance voltage set up by 4L, resulting from any given water temperature, has been reduced, it is necessary to reduce the out-of-balance voltage set up by 4R if the out-of-balance voltages of the two bridges are to remain equal.

Accordingly when changing link 22 from the 70° position to the 100° position, link 24 at the same time is to be changed so as to increase the resistance of 20R and reduce the energization of the air bridge 4R to the corresponding necessary extent.

The full value of 20R, utilized when link 24 is in the position marked 100°, is therefore adjusted to a value such that the two bridges are in balance at 230° F. under this condition.

The effect of this adjustment is to add 30° to all of the characteristics shown in Fig. 3. In other words the group of characteristic curves is displaced vertically by this amount exactly as shown at (d) in the upper portion of Fig. 4.

As stated in respect to Fig. 3 any one of these characteristics can be further modified for increased or decreased heat by action of the control device 12.

I show also in Fig. 1 two intermediate taps on 21 and 20R correspondingly marked 80° and 90°. If the links 22 and 24 are placed in the 80° position all of the curves shown in Fig. 3 are displaced upwards corresponding to an increase of temperature of 10° throughout the operating range. Correspondingly, in the position marked 90° a vertical displacement of 20° is provided. The operation which results from the 80° and the 90° position is indicated fragmentarily at (b) and (c) in Fig. 4, the portions of the characteristics which would cause confusion by intersection being omitted.

It is to be understood that the five lines radiating from the normal temperature axis of 70° air temperature and water temperature, shown in part at (a) in Fig. 4, are exactly the same as in Fig. 3. That is to say, they intersect the five air temperature axis of −20, −10, 0, +10, +20 at 200°. With the links 22 and 24 in the 80° position, the five lines in Fig. 4, shown in part at (b), their origin being 80° water temperature, would intersect the corresponding air temperature axis at 210°.

Likewise, with a 90° water base the five lines shown at (c) intersect correspondingly at 220°.

The characteristics for the 100° water base temperature are fully indicated at (d) in Fig. 4, intersecting at 230° water temperature.

Although I have chosen a particular embodiment of my invention for the purpose of explanation, many modifications thereof will be apparent to those skilled in the art to which it pertains. My invention, therefore, is not to be limited except in so far as is necessitated by the prior art and the spirit of the appended claims.

What I claim as new and desire to secure by Letters Patent of the United States is:

1. Apparatus for controlling the supply of a fluid heating medium in a conduit, comprising: a valve for variably admitting the fluid to the conduit, electrical means for variably adjusting said valve, a first thermal resistance element responsive to the temperature at one location, a second thermal resistance element responsive to the temperature at another location, a first electrical bridge including said first resistance element, a second electrical bridge including said second resistance element, means for separately energizing each of said bridges across one conjugate arm of each with electric energy, said energizing means comprising means for adjusting the value of the electric energy supplied to each bridge, means connected to said energy adjusting means for concurrently increasing the energization of one of said bridges and decreasing the energization of the other of said bridges, means connecting the opposite conjugate arms of said bridges so that the out-of-balance voltages derived therefrom are in opposition, and magnetic amplifier means energized in accordance with the difference between said voltages, for actuating said electrical valve adjusting means.

2. A heat regulating system comprising: control means for varying the amount of heat delivered, electrical means for variably adjusting said control means, a first thermal resistance element responsive to the temperature at one location, a second thermal resistance element responsive to the temperature at another location, a first electrical bridge including said first resistance element, a second electrical bridge including said second resistance element, means for separately energizing each of said bridges across one conjugate arm of each bridge with electric energy, said energizing means comprising means for separately adjusting the value of energy supplied to each bridge, means connected to said energy adjusting means for concurrently increasing the energization of one of said bridges and decreasing the energization of the other of said bridges, and magnetic amplifier means connected to said opposite conjugate arms and to said electrical means for actuating said control means in response to the voltages across said last-mentioned arms.

3. Apparatus for controlling the supply of heat in accordance with a relation between the temperature at two different points, a first thermal resistance element responsive to the temperature at one of said points, a second thermal resistance element responsive to the temperature at the other of said points, a first electrical bridge including in one arm thereof said first thermal resistance element, a second electrical bridge including in one arm thereof said second thermal resistance element, a source of alternating current, a pair of rectifiers energized from said source, means for energizing each of said bridges across one conjugate arm of each bridge from said rectifiers, said energizing means comprising means for adjusting the energy supplied to one of said bridges, means connected to said energy adjusting means and to one arm of the other of said bridges for concurrently adjusting the energization of said one bridge and the balance of said other bridge, whereby the output voltages across the opposite conjugate arms of said bridges for a predetermined temperature difference between the temperatures at the said two different points may be changed while the output voltages for another temperature difference therebetween may be maintained equal, means connecting the opposite conjugate arms of said bridges so that the out-of-balance voltages derived therefrom are in opposition and means energized in accordance with the difference between said last-mentioned voltages for controlling the supply of heat.

4. A heat regulating system comprising: control means for varying the amount of heat delivered, electrical means for variably adjusting said control means, a first thermal resistance element responsive to the temperature at one location, a second thermal resistance element responsive to the temperature at another location, a first electrical bridge including said first resistance element, a second electrical bridge including said second resistance element, means for energizing each of said bridges across one conjugate arm of each bridge, said energizing means comprising means for adjusting the energy supplied to one of said bridges, means connected to said energy adjusting means and to one arm of the other of said bridges for concurrently adjusting the energization of said one bridge and the balance of said other bridge, whereby the output voltages across the opposite conjugate arms of said bridges for a predetermined temperature difference between the temperatures at the said two different locations may be changed while the output voltages for another temperature difference therebetween may be maintained equal, and magnetic amplifier means connected to said opposite conjugate arms and to said electrical means for actuating said control means in response to the voltages across said opposite conjugate arms.

5. In apparatus for controlling a supply of heat in accordance with a relation between the temperatures at two different points, a first thermal resistance element responsive to the temperature at one of said points, a second thermal resistance element responsive to the temperature at the other of said points, a first electrical bridge including said first-mentioned thermal resistance element, a second electrical bridge including said second-mentioned thermal resistance element, a source of alternating current, a pair of variable inductance devices, means for concurrently and oppositely actuating said devices, means for connecting said devices in series across said source, a first rectifier energized in accordance with the voltage across one of said devices, a second rectifier energized in accordance with the voltage across the other of said devices, means for energizing said first bridge from said first rectifier and said second bridge from said second rectifier, whereby the relative energizations of said bridges is varied in accordance with the position of said actuating means, thereby to vary the rate of change of the temperature at one of said points in response to a temperature change at the other of said points.

6. In apparatus for controlling a supply of heat in accordance with a relation between the temperatures at two different points, a first thermal resistance element responsive to the temperature at one of said points, a second thermal resistance element responsive to the temperature at the other of said points, a first electrical bridge including said first-mentioned thermal resistance element, a second electrical bridge including said second-mentioned thermal resistance element, a source of alternating current, a pair of variable impedance devices, means for concurrently and oppositely actuating said devices, means connecting said devices in series across said source, means for energizing said first bridge in accordance with the voltage across one of said devices, means for energizing said second bridge in accordance with the voltage across the other of said devices, whereby the relative energizations of said bridges is varied in accordance with the position of said actuating means, thereby to vary the rate of supply of heat upon a temperature change at one of said points.

7. In apparatus for controlling a supply of heat in accordance with a relation between the temperatures at two different points, a first thermal resistance element responsive to the temperature at one of said points, a second thermal resistance element responsive to the temperature at the other of said points, a first electrical bridge including in one arm thereof said first-mentioned thermal resistance element, a second electrical bridge including in one arm thereof said second-mentioned thermal resistance element, a source of alternating current, a pair of rectifiers energized from said source, means for energizing each of said bridges across one conjugate arm of each from said rectifiers, respectively, means connecting the opposite conjugate arms of said bridges so that the out-of-balance voltages derived therefrom will be in opposition, means energized in accordance with the difference between said voltages for controlling said supply of heat, together with an adjustable resistance connected in another arm of said first-mentioned bridge, a second adjustable resistance connected to vary the energization of said second-mentioned bridge, and means for jointly adjusting both of said adjustable resistances so as to provide a variation in said controlling action.

ALAN S. FITZ GERALD.

REFERENCES CITED

The following references are of record in the file of this patent:

UNITED STATES PATENTS

| Number | Name | Date |
| --- | --- | --- |
| 2,050,446 | Meyer | Aug. 11, 1936 |
| 2,250,946 | Brown et al. | July 29, 1941 |
| 2,272,492 | Weyher | Feb. 10, 1942 |
| 2,297,705 | Jehle | Oct. 6, 1942 |
| 2,421,420 | Hathaway | June 3, 1947 |
| 2,431,790 | Crosthwait et al. | Dec. 2, 1947 |

FOREIGN PATENTS

| Number | Country | Date |
| --- | --- | --- |
| 45,078 | France | Mar. 11, 1935 |
| 777,297 | France | Nov. 26, 1934 |